(12) United States Patent
Stretton

(10) Patent No.: US 7,484,354 B2
(45) Date of Patent: Feb. 3, 2009

(54) AIRCRAFT ENGINE ARRANGEMENT

(75) Inventor: Richard G Stretton, Loughborough (GB)

(73) Assignee: Rolls-Royce plc, London (GB)

( * ) Notice: Subject to any disclaimer, the term of this patent is extended or adjusted under 35 U.S.C. 154(b) by 400 days.

(21) Appl. No.: 11/298,599

(22) Filed: Dec. 12, 2005

(65) Prior Publication Data

US 2006/0101804 A1    May 18, 2006

Related U.S. Application Data

(63) Continuation of application No. PCT/GB2004/002801, filed on Jun. 30, 2004.

(51) Int. Cl.
 *F02C 7/32* (2006.01)
(52) U.S. Cl. ............................ 60/226.1; 60/802
(58) Field of Classification Search ............ 60/802, 60/226.1
 See application file for complete search history.

(56) References Cited

U.S. PATENT DOCUMENTS

| | | | |
|---|---|---|---|
| 3,830,058 A | | 8/1974 | Ainsworth |
| 4,308,464 A | * | 12/1981 | Yamamoto ............... 290/52 |
| 4,437,627 A | * | 3/1984 | Moorehead ............... 244/54 |
| 5,143,329 A | | 9/1992 | Coffinberry |
| 5,410,870 A | * | 5/1995 | Brault et al. ............... 60/802 |
| 6,134,880 A | * | 10/2000 | Yoshinaka ............... 60/226.1 |
| 6,289,665 B1 | | 9/2001 | Saiz |

FOREIGN PATENT DOCUMENTS

| | | |
|---|---|---|
| GB | 0 642 585 SP | 9/1950 |
| GB | 0 744 695 SP | 2/1956 |
| GB | 1 127 659 SP | 9/1968 |
| GB | 1 277 853 SP | 6/1972 |
| GB | 1 358 076 SP | 6/1974 |
| GB | 2041090 | * 9/1980 |

* cited by examiner

*Primary Examiner*—Ted Kim
(74) *Attorney, Agent, or Firm*—W. Warren Taltavull; Manelli Dension & Selter & PLLC

(57) ABSTRACT

In order to avoid external bulging (5) to accommodate accessory mechanisms (27) and gearboxes (30) to drive these mechanisms (27) in accordance with the present invention splitter fairings (26) are located within a bypass duct (23) of an engine (20). The bypass duct (23) is defined between a casing (21) and compressor/turbine propulsion core (22). The fairings (26) are of sufficient dimensions to accommodate the accessory mechanisms (27) whilst the bypass duct (23) is appropriately shaped axi-symmetrically to eliminate and balance any blocking effect of these fairings (26) within the duct (23) upon air flow (24). Further fairings (26') may be provided to accommodate oil tank reservoirs (34) as well as filter/heat exchanger mechanisms (35) for the engine (20). In such circumstances, a notional elongate cylindrical profile for the engine (20) is maintained such that a reduced cross section is require for that engine (20) and so allowing a smaller airframe with better sonic boom signature.

17 Claims, 3 Drawing Sheets

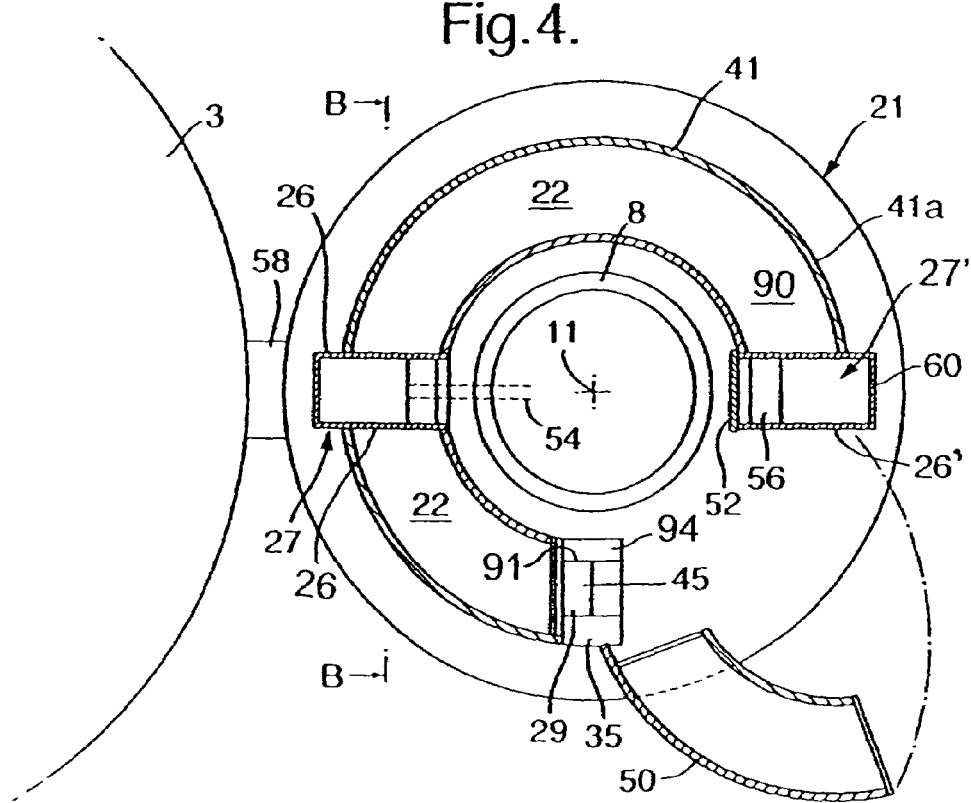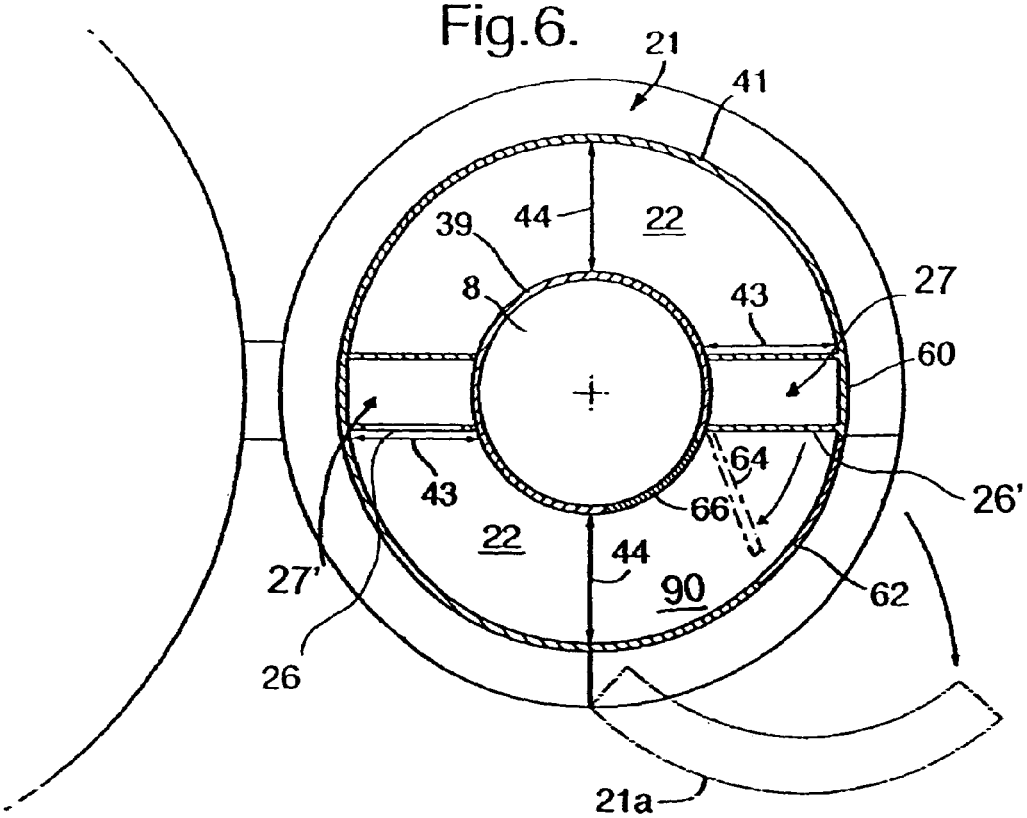

AIRCRAFT ENGINE ARRANGEMENT

This application is a continuation of PCT/GB04/02801, filed Jun. 30, 2004.

FIELD OF THE INVENTION

The present invention relates to aircraft engine arrangements and more particularly to engine arrangements used in relatively high speed or super-sonic aircraft applications.

BACKGROUND OF THE INVENTION

In a relatively modern aero-gas turbine engine certain accessories, such as the gearbox and electrical starter/generator, are mounted outwardly of the fan casing within the nacelle or airframe within which the engine is embedded. Accessory services, such as oil feed pipes and electrical cables, are routed through fairings spanning across the bypass duct. These fairings do not carry structural loads, but provide an aerodynamic shape around the accessory services.

To minimise aerodynamic drag the nacelle or airframe is tightly wrapped around the engine, minimising frontal area. However, one disadvantage is that aerodynamic shape of the airframe or nacelle is compromised with bulging to accommodate the accessories. Clearly, any bulging can be streamlined but by implication will be detrimental to the aircraft drag coefficient due to steeper cowl angles required to clear the engine accessories. For super-sonic aircraft, such bulging is also known to increase the sonic boom of the nacelle.

GB744,695 discloses a compact two-circuit gas turbine engine comprising a core engine having, in downstream flow sequence, a compressor, a combustor and a turbine. The core gas flow is turned and directed forwardly to flow through the combustor which is housed in an array of discrete tubes. The engine further comprises discrete bypass flow tubes which are, in a circumferential direction, alternately spaced between the combustor tubes. As the combustor tubes extend only an axial portion of the bypass tubes, engine accessories are housed between the bypass tubes and axially forward of the combustor tubes. Although this engine configuration is shorter by virtue of the reverse flow combustor, it is seriously disadvantaged as reversing the gas flow induces substantial flow energy losses and causes gas flow disruption into the combustor. Further, the circumferentially alternating bypass and combustor tubes mean that for any given air flow through the core engine, not only is there an annular inlet, but also the reversed combustor core flow occupies a substantial portion of what would be, in a modern conventional gas turbine engine, a substantially annular bypass duct. Thus the bypass gas flow is subject to substantial energy losses ingressing, flowing through and egressing the discrete bypass tubes. Thus the frontal area of this engine would be significantly greater than a conventional gas turbine engine having an annular bypass duct and no reversed combustor flow. Furthermore, GB744,695 does not disclose either a fairing spanning across a bypass duct or of mounting accessories within such a fairing. The engine of GB744,695 is not suitable for high-speed or super-sonic flight.

SUMMARY OF THE INVENTION

In accordance with the present invention there is provided a gas turbine engine comprising a rotational axis, a fan, a core engine surrounded by an outer casing thereby defining a bypass duct, engine accessories and a fairing, the fairing extends generally radially between the core engine and the outer casing characterised in that the engine accessories are housed within the fairing. The accessories are drivingly connected to the core engine via a drive shaft.

The accessories comprise a gearbox and drivingly mounted thereon other accessories. Preferably, the accessories are arranged substantially axially with respect to the engine rotational axis and the other accessories are arranged substantially axially along the gearbox to minimise cross sectional area of the fairing.

Alternatively, the accessories are arranged substantially perpendicular with respect to the engine rotational axis.

Alternatively, the accessories are angled between perpendicular and parallel to the engine rotational axis.

Preferably, the other accessories are arranged with respect to their size to define an aerodynamic shape of the fairing.

Preferably, at least two fairings are provided and where and where at least two fairings are provided a conventional annular array of guide vanes is advantageously not required.

Preferably, the fairing is capable of transferring engine loads between the core engine and the outer casing, the structural loads comprise any one or more from the group thrust, lateral, vertical or torsional loads. Herein, the fairings are curved and arranged to straighten the bypass air flow from the fan.

Preferably, the engine is surrounded by a nacelle to minimise aerodynamic drag.

Preferably, the fairings are in aerodynamic balance across the engine.

Preferably, at least one casing is adapted for airflow normalisation across the bypass duct and such adaptation is by barrelling of the at least one casing.

Preferably, the fairings and/or a gearbox casing provide heat shielding for the accessory mechanisms.

Alternatively, the fairings accommodate an oil tank and/or fuel oil heat exchangers.

Preferably, a portion of the bypass duct is movable to allow access to the fairing.

Alternatively, an access door is provided in the casing and an access door is provided in the fairing (26).

BRIEF DESCRIPTION OF THE DRAWINGS

Embodiments of the present invention will now be described by way of example with reference to the accompanying drawings in which:

FIG. 4 is a schematic front section of an aircraft turbine engine arrangement in accordance with the present invention;

FIG. 6 is a schematic front section taken through the Horizontal centre line of an aircraft turbine engine arrangement in accordance with the present invention.

DETAILED DESCRIPTION OF THE INVENTION

Figure 1:
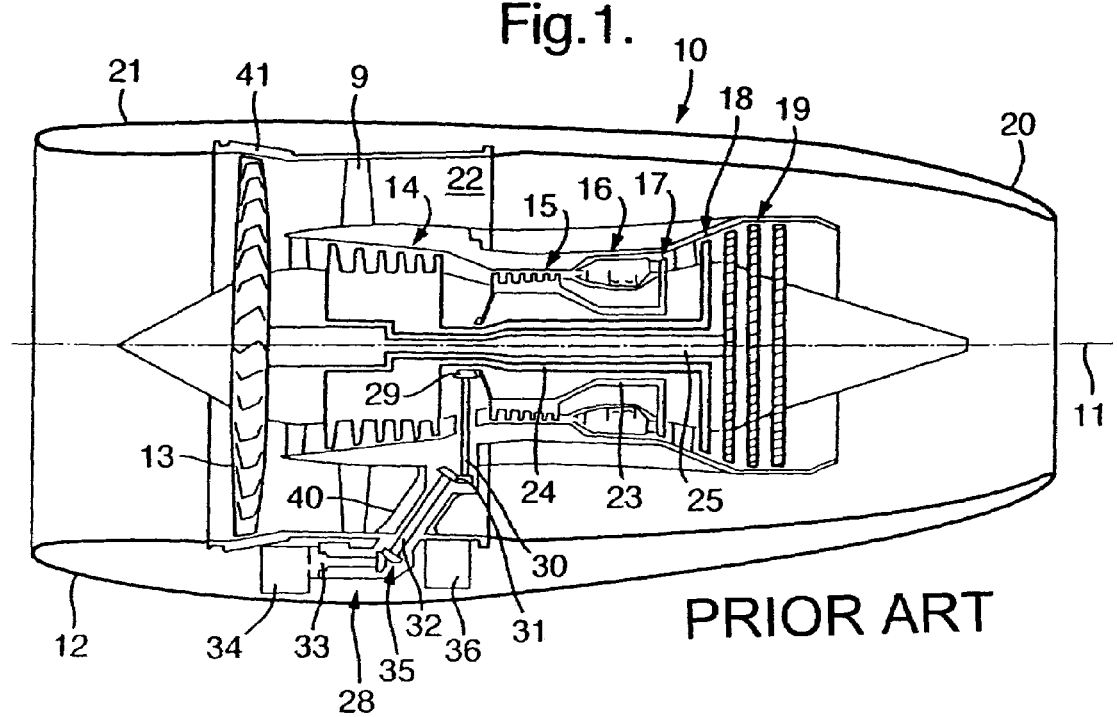
FIG. 1 is a schematic side section of a prior art gas turbine engine mounted with in a nacelle.

With reference to FIG. 1, a conventional prior art ducted fan gas turbine engine generally indicated at 10 has a principal and rotational axis 11. The engine 10 comprises, in axial flow series, an air intake 12, a propulsive fan 13, and a core engine 8 itself comprising an intermediate pressure compressor 14, a high-pressure compressor 15, combustion equipment 16, a high-pressure turbine 17, and intermediate pressure turbine 18, a low-pressure turbine 19; the engine 10 further comprises an exhaust nozzle 20. A nacelle 21 generally surrounds the engine 10 and defines both the intake 12 and the exhaust nozzle 20.

The gas turbine engine 10 works in a conventional manner so that air entering the intake 12 is accelerated by the fan 13 to produce two air flows: a first air flow into the core engine 8 and on through the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by associated interconnecting shafts 23, 24, 25.

The fan 13 is circumferentially surrounded by a structural member in the form of a fan casing 41, which is supported by an annular array of outlet guide vanes 9 spanning between a casing 39 that surrounds the core engine 8.

The engine 10 further comprises a gearbox/generator assembly 28 used for engine start up and for generating electricity once the engine has been started and working in convention fashion. The generated electricity is used for engine and associated aircraft electrical accessories as well known in the art. The gearbox/generator assembly 28 is drivingly connected to the high-pressure shaft 24 via drive means 35, however, in other embodiments the gearbox/generator assembly 28 may be driven by any one or more of the shafts 24, 25. In this embodiment, the gearbox/generator assembly 28 comprises an internal gearbox 29 connecting a first drive shaft 30 to the high-pressure shaft 23, an intermediate gearbox 31 connecting the first drive shaft 30 to a second drive shaft 32 and an external gearbox 33 drivingly connected to the second drive shaft 32. The external gearbox 33 is drivingly connected to a generator 34 that is capable of the aforesaid operation. The generator 34 and external gearbox 33 are mounted on the fan casing 41 and housed within the nacelle 21. The first drive shaft 30, intermediate gearbox 31 and the second drive shaft 32 are housed within a bypass duct splitter fairing 40.

With reference to "The Jet Engine" book, Rolls-Royce plc, 1986 5th edition, ISBN 0902121235, pages 66-71, not only does the gearbox 33 drive the starter and generator 36, but also drives other accessories such as numerous pumps. Conventionally, the gearbox 33 and driven accessories (36) are arranged circumferentially about the fan casing 41 and generally at the bottom of the engine 10.

Other engine accessories 36, as known in the art, are also mounted on the fan casing 41.

Generally, a turbine engine includes a number of rotating compressor blades 13, 14, 15 and turbine blades 17, 18, 19 arranged about a common axis 11. In such circumstances notionally a turbine engine is cylindrical. Thus, the base shape for a turbine engine is a longitudinal cylinder and any accessory mechanisms 28, 36 to that base cylindrical shape will protrude externally. With regard to high speed aircraft, its aerodynamic profile and envelope is highly important with regard to drag coefficient as well as sonic boom/noise. In such circumstances, previous protrusions and bumps caused by gearbox and accessory mechanisms to the base engine cylindrical profile cause problems when attempting to minimise aerodynamic profile.

Figure 2:
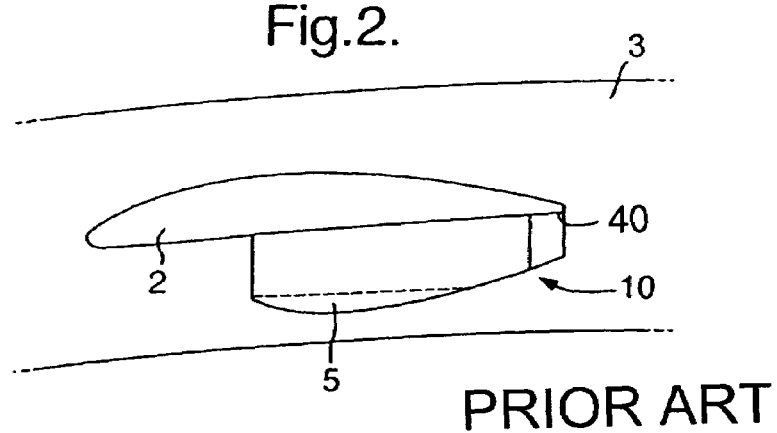
FIG. 2 is a schematic side view of a possible high speed aircraft turbine engine configuration upon a wing.

FIG. 2 illustrates a typical high speed engine arrangement on a wing 2 of an aircraft 3. As can be seen, the wing 2 is associated with a turbine engine 10. With high speed and potentially supersonic speed a conventional pitot type nacelle intake is unsuitable due to the severity of shock wave formation and therefore progressively reduced intake efficiency is experienced as inlet air speed increases. Thus, at high speeds so-called external/internal compression intake configurations, where supersonic airflow in to the intake is substantially reduced to subsonic to match the engine compressor requirements, are preferred. This type of intake arrangement, as shown in FIG. 2, produces a series of mild shockwaves without excessively reducing the compressor intake efficiency.

In order to reduce aerodynamic drag the fan diameter is kept to a minimum, often resulting in a relatively long engine length. The relatively long and thin aspect of the engine 10 is compromised by the requirement to provide accessory mechanisms within the nacelle 21 which results in at least one protrusion bulge 5, in this example, below the engine 10. This bulge 5, although aerodynamically smoothed, still intensifies the aerodynamic drag co-efficient as well as causing increased sonic boom intensity.

Ideally, the engine profile within a nacelle should be minimised in order to achieve as low an aerodynamic drag coefficient as possible as well as at high speeds reduce environmental noise problems with respect to sonic boom. The present invention relates to an arrangement of the engine wherein the accessory mechanisms are incorporated within the base cylindrical profile of the engine, thus significantly reducing aerodynamic drag helping to minimise sonic boom.

Figure 3:
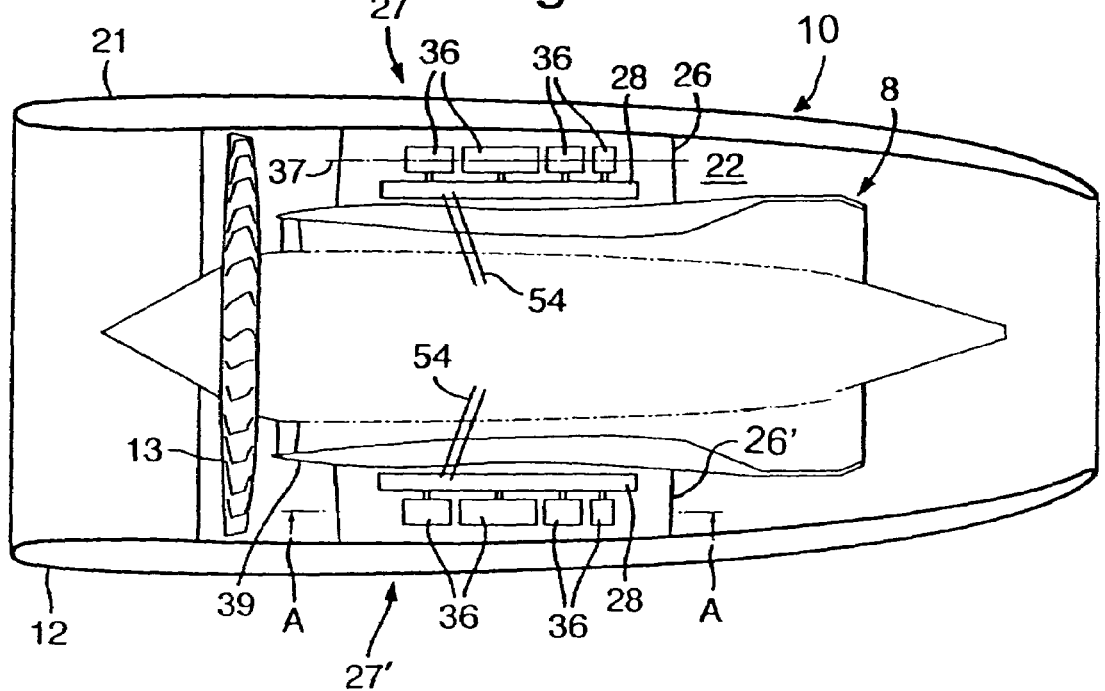
FIG. 3 is a schematic longitudinal cross-section taken through the Horizontal centre line of an aircraft turbine engine arrangement in accordance with the present invention.

Referring now to FIGS. 3 and 4 it can be seen that the generally cylindrical profile of the nacelle or casing 21 of the engine 10 is maintained whilst accessory mechanisms are arranged within that profile. The engine 10 is generally configured as described with reference to FIG. 1, however those differences attributed to the present invention will now be discussed.

In accordance with the present invention, a fairing 26 is provided and located within the bypass duct 22 which house accessory mechanisms 27. These accessory mechanisms 27 include the gearbox/generator 28 as well as other accessories 36 such as pumps for oil, fuel, dedicated airframe electrical generators and hydraulic actions. The gearbox 28 is now substantially axially aligned (to axis 11) and each of the driven accessories 36 is also substantially axially aligned within the fairing 26. Thus the axes of rotation of the accessories 36 driven from the gearbox 28 are substantially normal to the engine axis 11.

Although it is preferable for the gearbox and accessories to be aligned generally parallel to the axis 11, it is also possible to align them generally perpendicular or even at an angle between parallel and perpendicular. An advantage of this is that the drive arm 54 engages the gearbox 28 at an advantageous and desired angle (FIG. 3) depending on where the drive arm 54 engages the core engine 8 and where the gearbox 28 is mounted within the fairing 26.

The fairings 26 are located within the general cylindrical profile of the engine 10 and do not create protrusion bumps 5 as described with reference to FIG. 2. In contrast with the prior art arrangement, the present invention allows a more cylindrical nacelle profile, which significantly reduces aerodynamic drag and/or reduce the aircraft's sonic boom signature.

The accessory mechanisms 27 are coupled to provide their necessary function in accordance with known procedures.

Figure 3A:
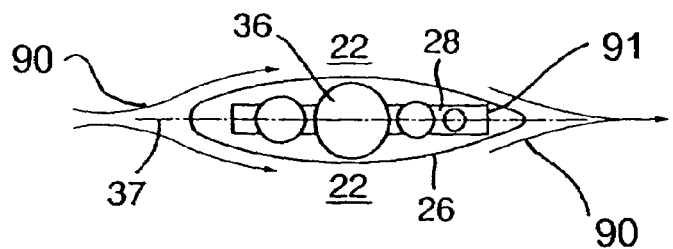
FIG. 3a, is a section through a fairing along A-A of FIG. 3.

FIG. 3a, shows a preferred arrangement of accessories 28, 36 within the fairing and the profile of the fairing 26 itself. The gearbox 28 is radially inwardly positioned to the accessories 36. The gearbox 28 is drivingly connected to the core engine 8 via drive shaft 54 and is generally axially aligned and arranged, thereby presenting the least area to the bypass flow stream. Each accessory 36 driven through the gearbox 28 is positioned such that the size of each accessory 36 conveniently defines an aerodynamic profile for the fairing 26. Such an arrangement of the accessories 28, 36 is particularly advantageous in minimising the amount of blockage in the bypass duct 22.

It should be appreciated that at least one other fairing 26' may be incorporated into the engine, the fairing including other accessories 27'.

Conventionally, the annular array of guide vanes 9 (FIG. 1) is capable of transmitting structural, aero and dynamic loads between the core engine 8 and the outer fan casing 41 and there to aircraft mounting architecture 58 (FIG. 4). A further advantage of the present invention is that the fairings 26, 26' are designed to carry structural, aero and dynamic engine loads. For the present invention at least some of the guide vanes 9 may be replaced by the fairings 26, 26' although it is possible that the entire array of guide vanes is replacable particularly where more than one fairing 26, 26' is provided.

In this case (FIGS. 4 and 6) the fairings 26, 26' are rigidly connected between the core casing 39 and fan casing 41 or casing 21. The fairings 26, 26' comprise a rigid box-like structure 60 capable of carrying thrust, vertical and horizontal loads as well as torsional engine loads. It should be appreciated by one skilled in the art that many different structural forms are possible, but such alternative forms are to be readily understood to be a means to transfer engine loads between the core engine 8 and the fan casing 41. The fairings 26, 26' are therefore rigidly connected to the outer casing 41 or 21 and the core casing 39, each casing being substantially annular and inherently very stiff. As the fairings 26, 26' extend axially a relatively long way compared to the prior art fairing 40 (FIG. 2) additional benefits of enhanced core engine stiffness are realised. Such benefits include improved control of blade tip clearances and therefore improved economy.

Figure 5:
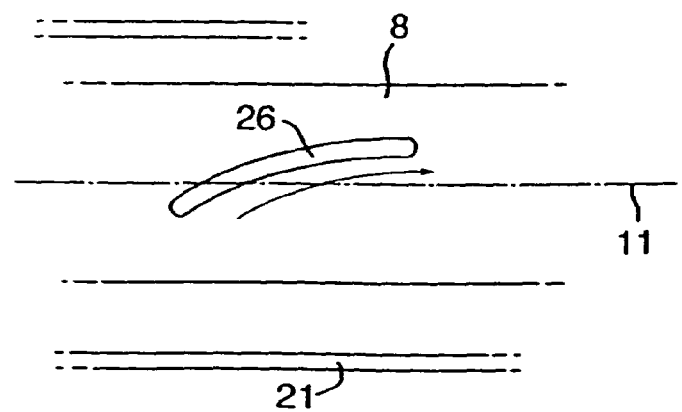
FIG. 5 is a schematic section along B-B in FIG. 4 of a fairing in accordance with a further embodiment of the present invention.

Referring to FIG. 5, it is well known that the guide vanes 9 are also provided to straighten the flow of bypass air, issuing from the fan 13. In a further embodiment of the present invention and as an additional advantage, the fairings 26, 26' are also curved to accomplish similar bypass air flow straightening.

Referring now to FIG. 6, the present invention allows the accommodation of the accessory mechanisms 27 within the fairing 26 but it would be understood that the fairings 26, being arranged within the bypass duct 22, would cause turbulence, blocking and non uniformity in the airflow 90. In such circumstances, internal shaping within the generally concentric relationship between the nacelle casing 21 and the core casing 39 to form the bypass duct 22 is configured to act to control airflow 90 for efficient engine 10 operation. The internal shaping involves barrelling of the concentric relationship between the casing 21 and a core casing 39 to effectively vary the bypass duct 22 radial extents at different circumferential positions to limit the effect of introduction of fairings 26 within that duct 22. This barrelling comprises the radial extent of the bypass duct 22 varying between 44 and 43 positioned generally away from the fairings 26, 26' and immediately adjacent the fairings 26, 26' respectively. Radial extent 43 is greater than extent 44.

This barrelling is produced either by shaping of the casing 21, the core casing 39 or both the casings 21, 39 being barrelled. Where the fairings 26, 26' vary in circumferential width in the downstream direction, due to the varying size of accessories housed therein, the degree of barrelling is also varied to maintain a constant or otherwise desired air flow 90 cross sectional profile. It should be appreciated that the amount of barrelling is relatively small and that the external profile of the nacelle is maintained cylindrical as hereinbefore advantageously described.

It will also be understood that although there would be greater detrimental effects with regard to airflow 90 and conventional (centre-line horizontal) orientation of the accessories it may be possible to provide three fairings in a 120° relationship or even four fairings with a spacing 90° from each other. Alternatively, the fairings in accordance with the present invention may be unbalanced in terms of the blocking cross-section with such asymmetric variations accommodated by varying in the bypass duct cross-section or otherwise.

In addition to fairings 26 which accommodate accessory mechanisms 27 it will also be understood that fairings 26 (FIG. 4) could be included which simply act as lubricant oil reservoir tanks 94 or accommodate oil filters 35 or provide appropriate positioning for heat exchangers 45 for oil or fuel cooling. With any high maintenance features it is desirable to locate them close to dedicated cut-out panels or access panels 50 in the engine casings.

It will be appreciated that the core engine 8, incorporating the combustor 16, turbines 17, 18, 19 and other devices, will become relatively hot. In such circumstances, the fairings 26 incorporate appropriate shielding means 91, 52 of the accessory mechanisms 27 from core 8 temperatures. In one embodiment this is achieved by using the gearbox casing 91 and seals with the core casing 39 and the fairings 26 to shield the engine accessories in a separate zone. Nevertheless, it will be appreciated that the airflow 90 through the ducts 22 will itself provide cooling of the fairing 26 and this in turn should limit heating problems with regard to the accessory mechanisms held within the fairings 26.

Generally, the mechanisms 27 held within the fairings 26 will be coupled to the propulsive power of the core engine 8 through adjacent gearbox 28. Thus, respective radial drive arms 54 (FIG. 4) from the core 8 drive these gearboxes 28 and so the accessory mechanisms 27 within the fairings 26. Alternatively, the accessories 27 could each be driven individually by an electric motor 56, rather than an engine powered radial drive.

Turbine engine 10 operations would be in accordance with normal procedure except that the fairings 26 allow location of accessory mechanisms 27 within the normal engine 10 cowling profile. In short, the accessory mechanisms 27 are located within the fairings 26 which span the bypass duct 22. Air flow 90 is maintained by appropriate asymmetric shaping and barrelling of the duct 22 to alleviate the blockage caused by the fairings 26. In such circumstances, even with such barrelling of the casing 21 the engine 10 has a smaller diameter than previously set by other considerations, (e.g. fan blade-off deflection profiles or engine pipework or ducting routed between the nacelle cowl 37 and engine casings 21). This diameter dictates the minimum nacelle size.

Clearly, it will be necessary to maintain the gearbox 28 as well as the accessory mechanisms 27 held within the fairings 26. In such circumstances, access to these fairings 26 and mechanisms 27 is made through dedicated access doors 50. These access doors 50 are disposed within and form part of the casing 21 structure which defines the bypass duct 22. The doors 50 are in the form of hinged ducts portions rotatably mounted about the nacelle casing 21. Alternatively the access doors 50 are removable. The access doors 50 provide improved duct 22 stiffness during flight whilst fixed sections 41a of the casing 41 provide structural strength for support of the engine components (e.g. thrust reverser/variable nozzle). The doors 50 provide access during maintenance activities to the fairing 26 housed accessories as well as the core engine 8 components.

With reference to FIG. 6, an alternative access configuration comprises a movable portion 21a of the nacelle 21, a movable panel 62 of the casing 41, a movable panel 64 of the fairing 26 for access to the accessories 27 and a movable panel 66 of the core casing 39. Although described as movable all these access panels 21a, 41, 62, 64 may be rotatably mounted or removable and securable by mechanisms as known in the art.

With a more desirable engine 10 profile, and therefore airframe or nacelle cross-section in which that engine 10 is located, it will be appreciated that there may be a reduced sonic boom signature compared with conventional previous high speed aircraft turbine engine arrangements. In addition, avoiding the detrimental aerodynamic effects of an exterior bulge causing increased cowling or casing drag should improve aircraft performance. Furthermore, if there is any bulging for airflow uniformity it will be spread laterally rather than vertically, that is to say across the air frame, fuselage or wing. A more regular engine 10 profile consistent with a base cylindrical shape allows necessary cross sectional area of the nacelle 21 formed around the engine 10 to be reduced which in turn allows the airframe fuselage profile to be defined within accepted aircraft design rules but with consequent reduction in sonic boom intensity with particular advantages for supersonic flight.

I claim:

1. A gas turbine engine comprising a rotational axis, a fan, a core engine surrounded by an outer casing thereby defining a bypass duct, engine accessories and a fairing, the fairing extends generally radially, with respect to said rotational axis, between the core engine and the outer casing, the engine accessories being housed within the fairing wherein the accessories comprise a gearbox and drivingly mounted on said gearbox are other accessories characterized in that said other accessories are arranged substantially axially, with respect to said rotational axis, along the gearbox to minimize the cross sectional area of the fairing wherein the fairing spans the bypass duct.

2. A gas turbine engine as claimed in claim 1 wherein the accessories are drivingly connected to the core engine via a drive shaft.

3. A gas turbine engine as claimed in claim 1 wherein the other accessories are arranged with respect to their size to define an aerodynamic shape of the fairing.

4. A gas turbine engine as claimed in claim 1 wherein at least two fairings are provided.

5. A gas turbine engine as claimed in claim 1 wherein the fairing is capable of transferring engine loads between the core engine and the outer casing.

6. A gas turbine engine as claimed in claim 5 wherein the structural loads comprise any one or more from the group of thrust, lateral, vertical or torsional loads.

7. A gas turbine engine as claimed in claim 1 wherein the fairing is curved and arranged to straighten the bypass air flow from the fan.

8. A gas turbine engine as claimed in claim 1 wherein the engine is surrounded by a nacelle to minimise aerodynamic drag.

9. A gas turbine engine as claimed in claim 1 wherein the fairing is in aerodynamic balance across the engine.

10. A gas turbine engine as claimed in claim 1 wherein at least one casing is adapted for airflow normalisation across the bypass duct.

11. A gas turbine engine as claimed in claim 10 wherein such adaptation is by barreling of the at least one casing.

12. A gas turbine engine as claimed in claim 1 wherein the fairing and/or a gearbox casing provide heat shielding for the accessory mechanisms.

13. A gas turbine engine as claimed in claim 1 wherein the fairing accommodates an oil tank and/or fuel oil heat exchangers.

14. A gas turbine engine as claimed in claim 1 wherein a portion of the bypass duct is movable to allow access to the fairing.

15. A gas turbine engine as claimed in claim 1 wherein an access door is provided in the casing.

16. A gas turbine engine as claimed in claim 1 wherein an access door is provided in the fairing.

17. An aircraft incorporating a gas turbine engine as claimed in claim 1.

* * * * *